(12) United States Patent
Takahashi et al.

(10) Patent No.: US 7,916,205 B2
(45) Date of Patent: Mar. 29, 2011

(54) PICKUP DEVICE DRIVING APPARATUS AND PHOTOGRAPHING DEVICE USING THE SAME

(75) Inventors: Masami Takahashi, Kanagawa (JP); Jouji Wada, Kanagawa (JP); Shokichi Takahashi, Tokyo (JP)

(73) Assignee: Panasonic Corporation, Osaka (JP)

( * ) Notice: Subject to any disclaimer, the term of this patent is extended or adjusted under 35 U.S.C. 154(b) by 1315 days.

(21) Appl. No.: 11/472,707

(22) Filed: Jun. 22, 2006

(65) Prior Publication Data

US 2007/0002148 A1 Jan. 4, 2007

(30) Foreign Application Priority Data

Jun. 30, 2005 (JP) ................................. 2005-191424

(51) Int. Cl.
*H04N 5/232* (2006.01)
*H04N 5/225* (2006.01)
*H04N 5/228* (2006.01)

(52) U.S. Cl. .................. 348/345; 348/219.1; 348/208.7; 348/373

(58) Field of Classification Search .................. 348/373, 348/374, 219.1, 208.99, 345, 208.7; 396/419
See application file for complete search history.

(56) References Cited

U.S. PATENT DOCUMENTS

| 4,634,884 | A | * | 1/1987 | Hayashimoto et al. | ....... 348/264 |
| 4,803,557 | A | * | 2/1989 | Bridges | .......................... 348/374 |
| 5,005,948 | A | * | 4/1991 | Takahashi et al. | ............ 348/355 |
| 5,214,513 | A | * | 5/1993 | Lee | ........................... 348/207.99 |
| 5,555,051 | A | * | 9/1996 | Maruyama et al. | ........... 396/144 |
| 5,640,207 | A | * | 6/1997 | Rahmouni et al. | ............. 348/374 |
| 5,969,760 | A | * | 10/1999 | Ernest et al. | ................ 348/219.1 |
| 6,236,430 | B1 | * | 5/2001 | Suzuki et al. | ............... 348/219.1 |
| 6,670,986 | B1 | * | 12/2003 | Ben Shoshan et al. | ..... 348/219.1 |
| 7,436,435 | B2 | * | 10/2008 | Wada | ........................ 348/208.99 |
| 2005/0270379 | A1 | * | 12/2005 | Seo | .............................. 348/219.1 |
| 2006/0017818 | A1 | * | 1/2006 | Enomoto | .................... 348/219.1 |
| 2006/0256199 | A1 | * | 11/2006 | Takahashi et al. | ........ 348/207.99 |
| 2007/0147193 | A1 | * | 6/2007 | Wada et al. | ................. 369/44.14 |

FOREIGN PATENT DOCUMENTS

EP 1 458 180 A2 9/2004

(Continued)

OTHER PUBLICATIONS

European Search Report for corresponding European Patent Application No. 06115996.8 dated Nov. 3, 2006.

(Continued)

*Primary Examiner* — Nhan T Tran
(74) *Attorney, Agent, or Firm* — RatnerPrestia

(57) ABSTRACT

A pickup device driving apparatus includes: a movable part which moves a pickup device in a first direction while a direction of a pickup surface is held; a linear actuator which moves an axis in a second direction different from the first direction; a direction changing part which has a bearing part provided in a third direction perpendicular to the first direction and the second direction, rotates on the bearing part, and changes a bias force applied in the second direction by the axis of the linear actuator to a bias force applied in the first direction, and applies the bias force to the movable part; and a weight part which is provided in the direction changing part to cancel a rotation moment of the bearing part generated in the direction changing part by the inclination of the movable part.

17 Claims, 11 Drawing Sheets

FOREIGN PATENT DOCUMENTS

| | | |
|---|---|---|
| EP | 1 491 931 A1 | 12/2004 |
| EP | 1 722 269 A1 | 11/2006 |
| JP | 58 148572 A | 11/1983 |
| JP | 03-188430 | 8/1991 |
| JP | 08-107526 | 4/1996 |
| JP | 27-020955 | 11/1997 |
| JP | 11-271631 | 10/1999 |
| JP | 2002-099019 | 4/2002 |
| JP | 2003-274229 | 9/2003 |
| JP | 2004-226775 | 8/2004 |

OTHER PUBLICATIONS

European Search Report for European Patent Application No. 06115996.8 dated Jun. 27, 2006.

* cited by examiner

FIG. 8A
FIG. 8B
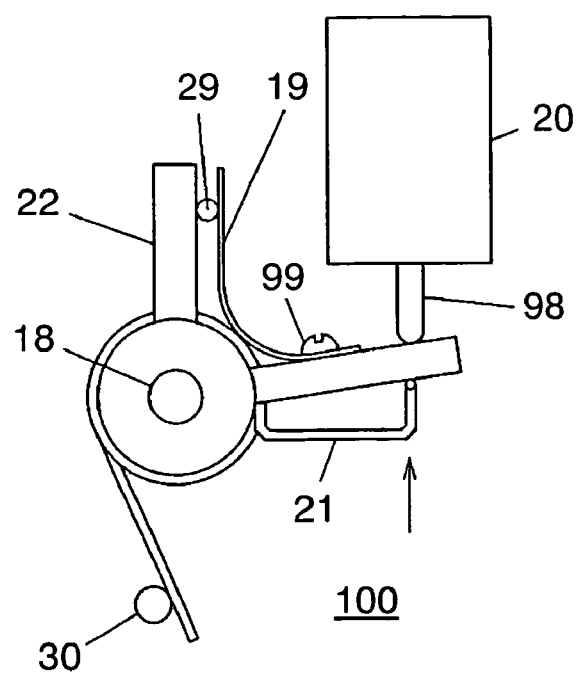
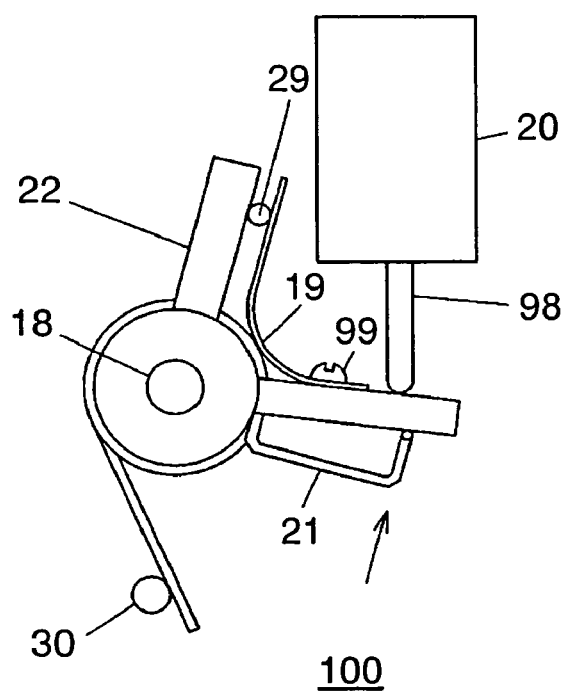
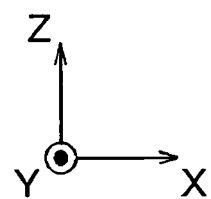
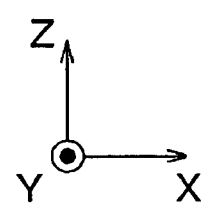

PICKUP DEVICE DRIVING APPARATUS AND PHOTOGRAPHING DEVICE USING THE SAME

TECHNICAL FIELD

The present invention relates to a photographing apparatus such as a monitoring camera apparatus or a video camera apparatus, and more particularly, to a pickup device driving apparatus for moving a pickup device in an optical axis direction of a lens and a photographing apparatus using the same.

BACKGROUND ART

Conventionally, in order to perform flange focus adjustment or focus adjustment, a photographing apparatus for automatically moving a pickup device in an optical axis direction of a lens using a driving part such as a motor to obtain a clear image is suggested (for example, Japanese Patent Unexamined Publication No. 2003-274229).

In such a photographing apparatus, a lead screw is used for moving a pickup device, the pickup device is attached to a nut which is rotatably provided relative to the lead screw, and the lead screw rotates by a stepping motor. By this configuration, the lead screw rotates by rotation of the stepping motor and thus the pickup device can be moved by a desired distance in the optical axis direction of the lens.

However, in such a photographing apparatus, when photographing is performed in a state that the photographing apparatus is inclined, driving due to the driving part is interrupted by the weight of a member such as the pickup device or a peripheral circuit part. More specifically, for example, in the above-described conventional technology, when photographing is performed in a state that the photographing apparatus is inclined such that a photographing direction becomes an upward direction or a downward direction, an oblique biasing force is generated between the lead screw and the nut provided with the pickup device, due to the weight of the member such as the pickup device or the like. When the driving part has no a sufficient force, the lead screw cannot smoothly rotate due to the biasing force. As a result, the pickup device cannot be adequately driven.

DISCLOSURE OF THE INVENTION

The present invention has been made in view of the above problem and provides a pickup device driving apparatus which is capable of adequately driving a pickup device even when photographing is performed in a state that a photographing apparatus is inclined such that a photographing direction becomes an upward direction or a downward direction, and a photographing apparatus using the same.

According to an aspect of the present invention, there is provided a pickup device driving apparatus including a movable part which has a pickup device and is capable of moving the pickup device in a first direction while a direction of a pickup surface is held; a driving part which has an axis part and is capable of moving the axis part in a second direction different from the first direction such that the movable part is moved; a direction changing part which is in contact with the axis part of the driving part and the movable part, has a rotation axis part provided in a third direction perpendicular to the first direction and the second direction, rotates on the rotation axis part, changes a bias force applied in the second direction by the axis part of the driving part to a bias force applied in the first direction, and applies the bias force to the movable part to move the movable part; and a weight part which is provided in the direction changing part to generate a rotation moment which cancels a rotation moment of the rotation axis part generated in the direction changing part by the inclination of the movable part.

By this configuration, since the movement direction of the movable part having the pickup device and the movement direction of the axis part of the driving part are different from each other and the direction changing part having the rotation axis part rotates, the direction of the bias force applied by the driving part can be changed to be transferred to the movable part. In addition, since the weight part which cancels the rotation moment generated in the direction changing part by the weight of the movable part is included in the direction changing part, even when the photographing apparatus is inclined such that a photographing direction becomes an upward direction or a downward direction, the rotation moment generated in the direction changing part is cancelled. Accordingly, it is possible to provide a pickup device driving apparatus capable of adequately driving the pickup device.

The direction changing part may include a first contact part which is in contact with the axis part of the driving part and a second contact part which is in contact with the movable part, and the weight part may be provided at the side opposite to the side of the direction changing part having the second contact part with respect to the rotation axis part.

By this configuration, since the weight part is provided at the side opposite to the side of the direction changing part having the second contact part, which is in contact with the movable part, with respect to the rotation axis part, it is possible to realize a configuration for more easily canceling the rotation moment generated in the direction changing part when the photographing apparatus is inclined.

A holding member for attaching the weight part may be provided at the side opposite to the side of the direction changing part having the second contact part with respect to the rotation axis part.

By this configuration, since the holding member is further included, the weight part is easily attached and the length from the rotation axis part to the weight part can be easily adjusted.

An elastic member for applying an elastic force to the direction changing part in an opposite direction of the bias force applied by the axis part of the driving part may be further included.

By this configuration, since the bias force applied by the axis part of the driving part is smoothly transferred to the direction changing part, the pickup device can be more smoothly moved.

When the weight of the movable part is W1, the weight of the weight part is W2, a distance between the center of the rotation axis part and a position in which the second contact part and the movable part are in contact with each other, and a distance between the center of the rotation axis part and the gravity center of the weight part, a relationship of W1×L1=W2×L2 may be satisfied.

By this configuration, when the photographing apparatus is inclined such that the photographing direction becomes the upward direction or the downward direction, the rotation moment generated in the direction changing part can be most efficiently cancelled.

The pickup device driving apparatus may further include a base part fixed to a lens part; a first support part and a second support part which are provided between the base part and the movable part facing the base part to support the movable part; a first rotating part which is provided between the base part and the first support part; a second rotating part which is provided parallel to the first rotating part in the optical axis direction, between the base part and the second support part; a third rotating part which is provided between the movable part and the first support part; and a fourth rotating part which is provided at an apex of a parallelogram with respect to the first rotating part, the second rotating part and the third rotating part, between the movable part and the second support part, wherein the rotating central axes of the first rotating part, the second rotating part, the third rotating part and the fourth rotating part may be perpendicular to the first direction and parallel to one another, and the position of the pickup device may be changed relative to the lens part in a state that the first rotating part, the second rotating part, the third rotating part and the fourth rotating part form the apexes of the parallelogram by driving of the driving part.

By this configuration, since the movable part includes four rotating parts of which the rotation axes are perpendicular to the first direction and one side is provided at the apex of the parallelogram parallel to the first direction, the pickup device can be moved in the optical axis direction of the lens part while the pickup surface is held in a predetermined direction by a simple configuration that the pickup device is attached to the movable part in a state that the pickup surface is directed in the predetermined direction. Accordingly, a possibility that mechanical rattle using the lead screw and the nut is generated is reduced, and, even when the pickup device is moved by a slight distance, it is possible to realize a pickup device driving apparatus having high precision.

At least one of the first rotating part, the second rotating part, the third rotating part and the fourth rotating part may be a leaf spring.

By this configuration, since mechanical rattle or friction is not generated in the leaf spring of the rotating parts connected to the members, hysteresis can be suppressed from being generated and driving precision can be improved.

The first rotating part, the second rotating part, the third rotating part and the fourth rotating part may be leaf springs.

By this configuration, since the rotating part connected to the members are leaf springs, mechanical rattle or friction is not generated, hysteresis can be suppressed from being generated, and driving precision can be improved.

The movable part, the first support part, the second support part and the leaf spring may be integrally formed and at least one of the movable part, the first support part and the second support part may have a reinforcement part for increasing rigidity.

By this configuration, since the movable part, the first support part, the second support part and the leaf spring can be manufactured by an integral member, a simple configuration can be realized. In addition, since at least one of the first support part and the second support part has the reinforcement part, a configuration having necessary rigidity can be realized.

A heat radiation part for radiating heat generated in the vicinity of the pickup device may be provided in the movable part.

By this configuration, since it is possible to allow heat generated in the vicinity of the pickup device to escape by radiation of the heat radiation part, it is possible to allow heat generated in the vicinity of the pickup device to escape without generating a frictional force even when a pickup device is moved in an optical axial direction.

The heat radiation part may be provided to face a heat sink part provided in a case.

According to this configuration, it is possible to allow heat to escape by radiation from the heat radiation part of the pickup device driving apparatus to the heat sink part provided in the case.

Convex parts may be provided on a surface of the heat radiation part facing the heat sink part.

By this configuration, since a heat radiation area increases, it is possible to increase radiation efficiency.

The convex parts of the heat radiation part may be provided to face concave parts of irregularities provided in the heat sink part.

By this configuration, since a facing area between the heat radiation part and the heat sink part increases, it is possible to increase radiation efficiency.

The convex parts of the heat radiation part may have fin which extends in a movement direction of the pickup device.

By this configuration, although the pickup device is moved, the heat radiation part is hard to come in contact with the heat sink part and thus radiation efficiency can increase.

The heat radiation part may not be in contact with the heat sink part within a movement range of the pickup device.

By this configuration, although the pickup device is moved, the heat sink part does not come in contact with the heat radiation part. Accordingly, it is possible to realize a configuration which can smoothly move the pickup device.

According to another aspect of the present invention, there is provided a photographing apparatus including a lens part; a case; the pickup device driving apparatus of the present invention; and an image signal processing part which performs an image signal process on a signal output from the pickup device of the pickup device driving apparatus.

By this configuration, since the movement direction of the movable part having the pickup device and the movement direction of the axis part of the driving part are different from each other and the direction changing part having the rotation axis part rotates, the direction of the bias force applied by the driving part can be changed to be transferred to the movable part. In addition, since the weight part which cancels the rotation moment generated in the direction changing part by the weight of the movable part is included in the direction changing part, even when the photographing apparatus is inclined such that a photographing direction becomes an upward direction or a downward direction, the rotation moment generated in the direction changing part is cancelled. Accordingly, it is possible to provide a photographing apparatus capable of adequately driving the pickup device.

According to another aspect of the present invention, there is provided a monitoring camera apparatus including the photographing apparatus of the present invention; an illumination-intensity change detecting part which detects change in illumination intensity; a filter part which attaches and detaches an infrared cut filter on an optical axis of the lens part depending on the change in illumination intensity detected by the illumination-intensity change detecting part; and a filter driving part which drives the movable part of the pickup device driving apparatus when the infrared cut filter of the filter part is attached and detached.

By this configuration, since the pickup device can be moved in the optical axis direction of the lens part in a state that the pickup surface is held in a predetermined direction with respect to the optical axis direction of the lens part when the infrared cut filter is attached and detached, displacement in a optical path length can be corrected when the infrared cut filter is attached and detached. Accordingly, it is possible to provide a monitoring camera apparatus capable of performing photographing with high precision day and night. Since the movement direction of the movable part having the pickup device and the movement direction of the axis part of the driving part are different from each other and the direction changing part having the rotation axis part rotates, the direction of the bias force applied by the driving part can be changed to be transferred to the movable part. In addition, since the weight part which cancels the rotation moment generated in the direction changing part by the weight of the movable part is included in the direction changing part, even when the photographing apparatus is inclined such that a photographing direction becomes an upward direction or a downward direction, the rotation moment generated in the direction changing part is cancelled. Accordingly, it is possible to provide a monitoring camera apparatus capable of adequately driving the pickup device.

As described above, according to the present invention, it is possible to provide a pickup device driving apparatus which is capable of adequately driving a pickup device even when photographing is performed in a state that a photographing apparatus is inclined such that a photographing direction becomes an upward direction or a downward direction, and a photographing apparatus using the same.

BRIEF DESCRIPTION OF THE DRAWINGS

FIG. 8A is a plan view showing a configuration of a driving part in the pickup device driving apparatus according to the embodiment of the present invention;

FIG. 8B is a plan view showing a configuration of the driving part in the pickup device driving apparatus according to the embodiment of the present invention;

DETAILED DESCRIPTION OF PREFERRED EMBODIMENTS

Hereinafter, embodiments of the present invention will be described in detail with reference to the attached drawings.

Embodiment

Figure 1:
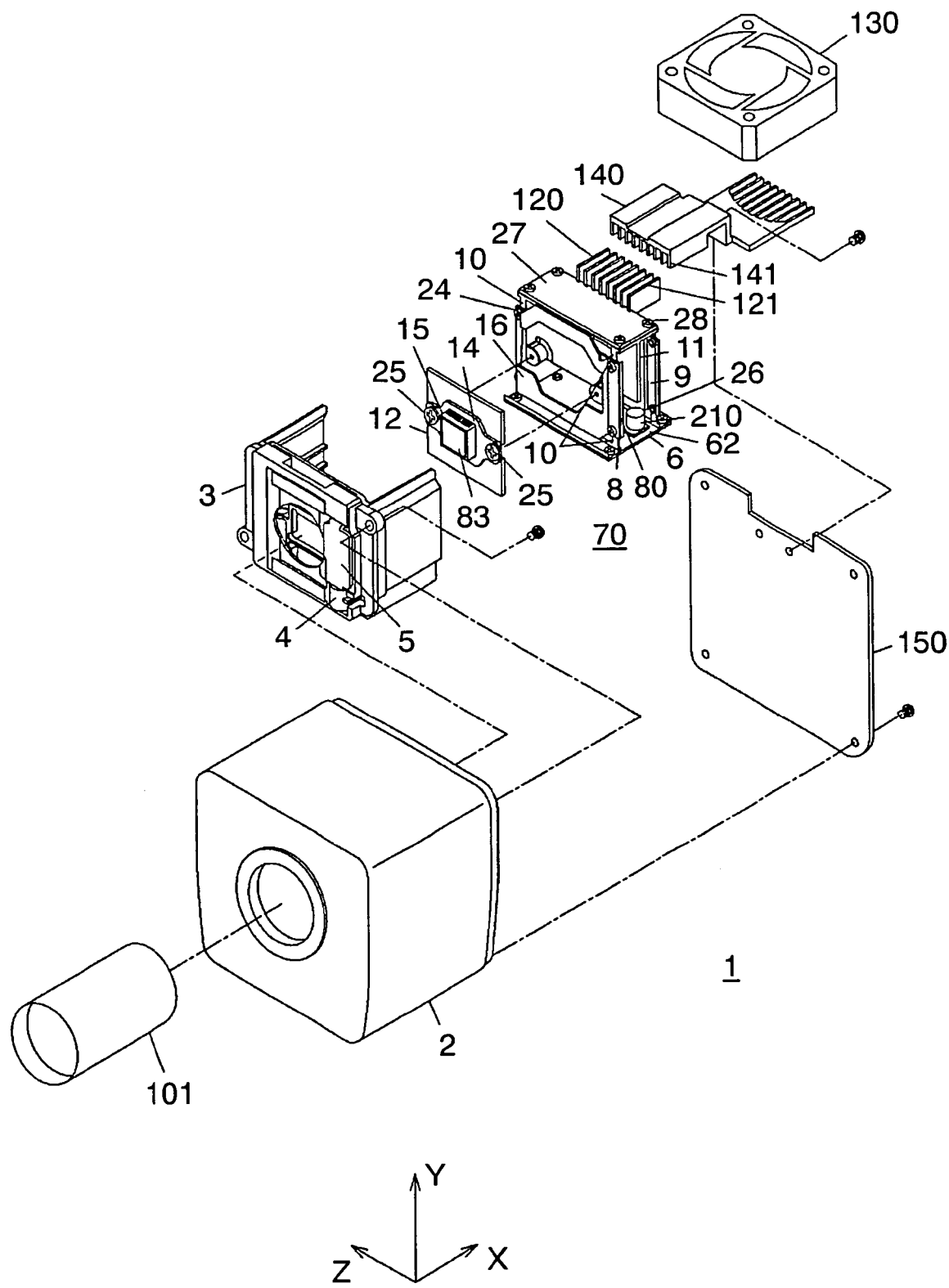
FIG. 1 is an exploded perspective view showing a configuration of photographing apparatus according to an embodiment of the present invention.

First, a configuration of photographing apparatus 1 according to an embodiment of the present invention will be described. FIG. 1 is an exploded perspective view showing a configuration of photographing apparatus 1 according to the embodiment of the present invention.

For simplification of description, in the embodiment of the present invention, an X axis direction, a Y axis direction and a Z axis direction perpendicular to one another are shown in the drawings. The X axis direction is an optical axis direction of a lens part, and the Y axis and Z axis direction are perpendicular to the optical axis direction. In the embodiment of the present invention, for understanding of description, detailed parts such as screw or the like will be omitted in the drawings.

As shown in FIG. 1, photographing apparatus 1 according to the embodiment of the present invention includes lens mounting part 2 attached with lens part 101, base attaching part 3 for connecting base 6 of pickup device driving apparatus 70 to lens mounting part 2, DC motor part 4, that is, a filter driving part, which is disposed on base attaching part 3 and moves below-described filter part 5 in a direction (Y axis direction) perpendicular to the optical axis direction, filter part 5 which is attached to DC motor part 4 and has an infrared cut filter (not shown) which can be moved in the Y axis direction by driving DC motor part 4, pickup device driving apparatus 70 which is attached to base attaching part 3, has heat radiation part 120 including convex parts 121, which has a fin shape and extends in the X axis direction, and can move pickup device (known pickup device such as CCD or CMOS sensor) 15 in a state that pickup surface 83 is perpendicular to the optical axis direction of lens part 101, heat sink part 140 which is provided such that convex parts 141 provided at one end thereof face concave parts between convex parts 121 of heat radiation part 120 of pickup device driving apparatus 70 and of which the other end has a comb-like fin and is air-cooled by fan motor 130 which is a cooling means, and attaching member 150 attached with heat sink part 140 and fixed to lens mounting part 2. In addition, the photographing apparatus 1 according to the embodiment of the present invention includes an image signal processing part (not shown) for performing an image signal process on a signal output from pickup device 15.

The configuration and operation of pickup device driving apparatus 70 mounted on photographing apparatus 1 according to the embodiment of the present invention will be described.

In the embodiment of the present invention, heat radiation part 120 and heat sink part 140 were obtained by die-casting aluminum and coating black alumite on the surface thereof to improve radiation efficiency. Convex parts 121 and 141 which extend in the optical axis direction of lens part 101 and have a width of 1.0 mm and a height of 3.5 mm are provided on the surface of heat radiation part 120 which faces heat sink part 140 (upper surface of FIG. 1) and the surface of heat sink part 140 which faces heat radiation part 120 (lower surface of FIG. 1), respectively.

Figure 2:
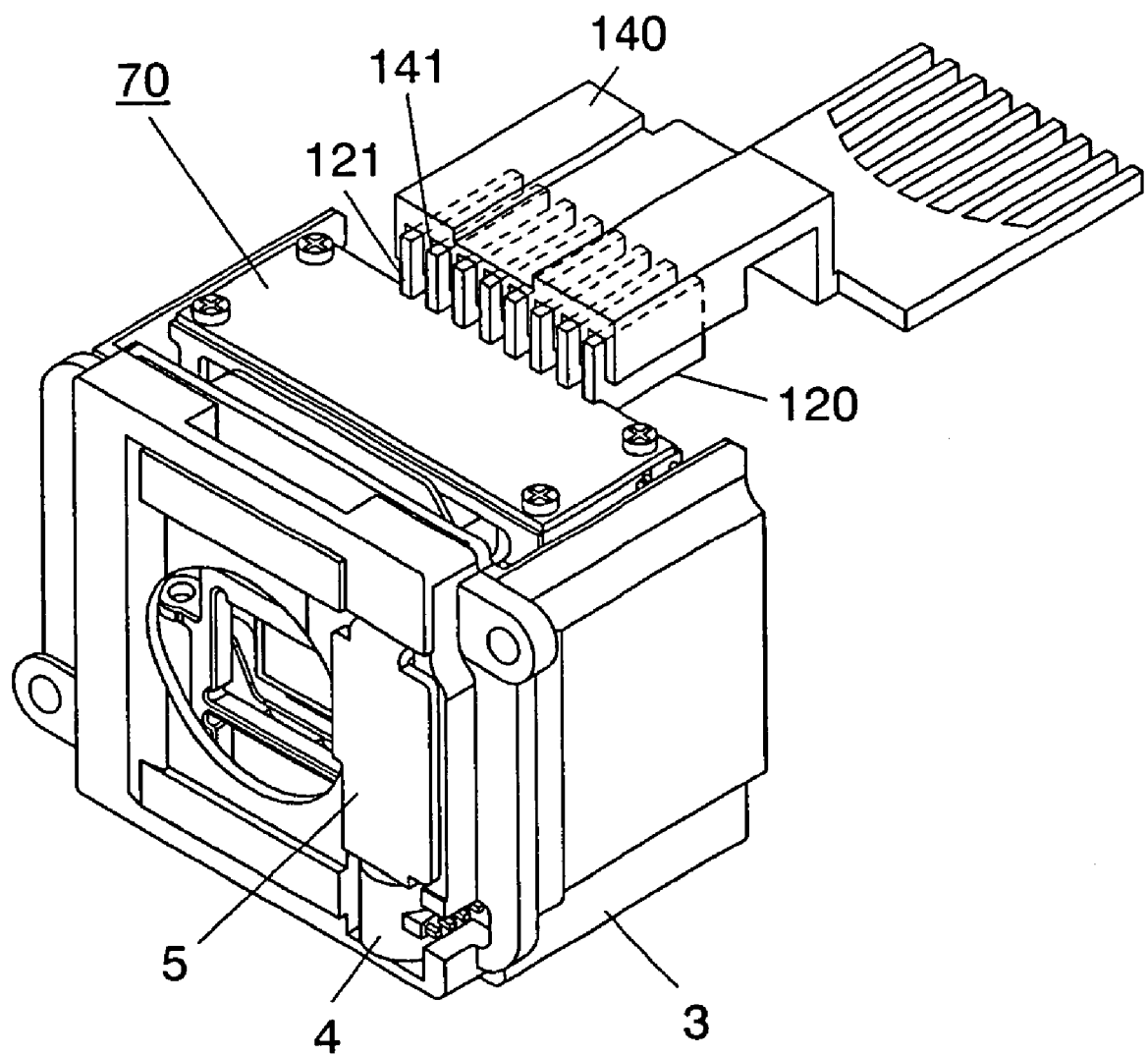
FIG. 2 is a view showing a positional relationship among a base attaching part, a pickup device driving apparatus, and a heat sink part when the photographing apparatus according to the embodiment of the present invention is used.
Figure 3:
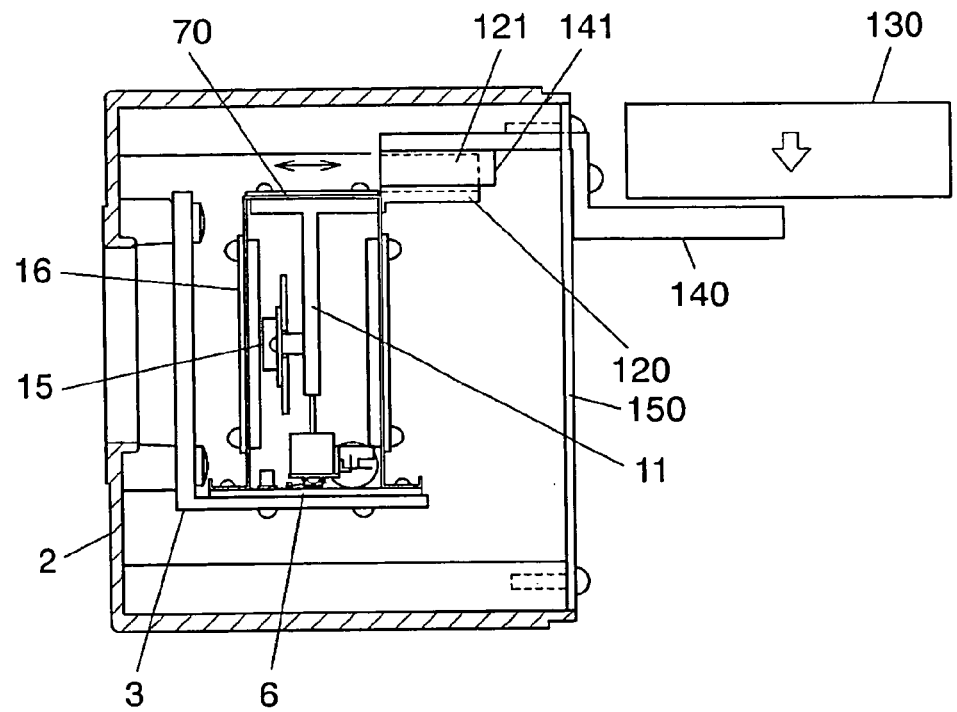
FIG. 3 is a cross-sectional view showing the positional relationship among the base attaching part, the pickup device driving apparatus, and the heat sink part in the photographing apparatus according to the embodiment of the present invention.
Figure 3:
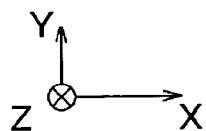

FIG. 2 is a view showing a positional relationship among base attaching part 3, pickup device driving apparatus 70, and heat sink part 140 when photographing apparatus 1 according to the embodiment of the present invention is used. FIG. 3 is a cross-sectional view showing the positional relationship among base attaching part 3, pickup device driving apparatus 70, and heat sink part 140 in photographing apparatus 1 according to the embodiment of the present invention. As shown in FIGS. 2 and 3, in photographing apparatus 1 according to the embodiment of the present invention, heat generated at pickup device 15 or peripheral driving circuit upon the usage is transferred to pickup device holding part 11 and heat radiation part 120. Thereafter, the heat is transferred to one end of heat sink part 140 by radiation of heat radiation part 120 through an air layer. At this time, in photographing apparatus 1 according to the embodiment of the present invention, since the other end of heat sink part 140 is cooled by fan motor 130, it is possible to suppress a temperature of pickup device 15 from rising. In photographing apparatus 1 according to the embodiment of the present invention, a comb-like fin is provided at the other end of heat sink part 140 in order to efficiently allow wind caused by fan motor 130 to flow at the other end or to improve radiation efficiency by increasing a contact area of heat sink part 140 for wind.

As shown in FIG. 2 or FIG. 3, in photographing apparatus 1 according to the embodiment of the present invention, heat radiation part 120 provided in pickup device driving apparatus 70 and heat sink part 140 attached to attaching member 150 fixed to lens mounting part 2 are provided such that convex parts 121 and 141 are alternately disposed, that is, irregularities provided in the surface of heat radiation part 120 and irregularities provided in surface of heat sink part 140 are engaged with each other while being spaced apart from each other. That is, convex parts 121 of heat radiation part 120 are disposed between convex part 141 of heat sink part 140 and convex parts 141 of heat sink part 140 are disposed between convex parts 121 of heat radiation part 120.

Figure 4:
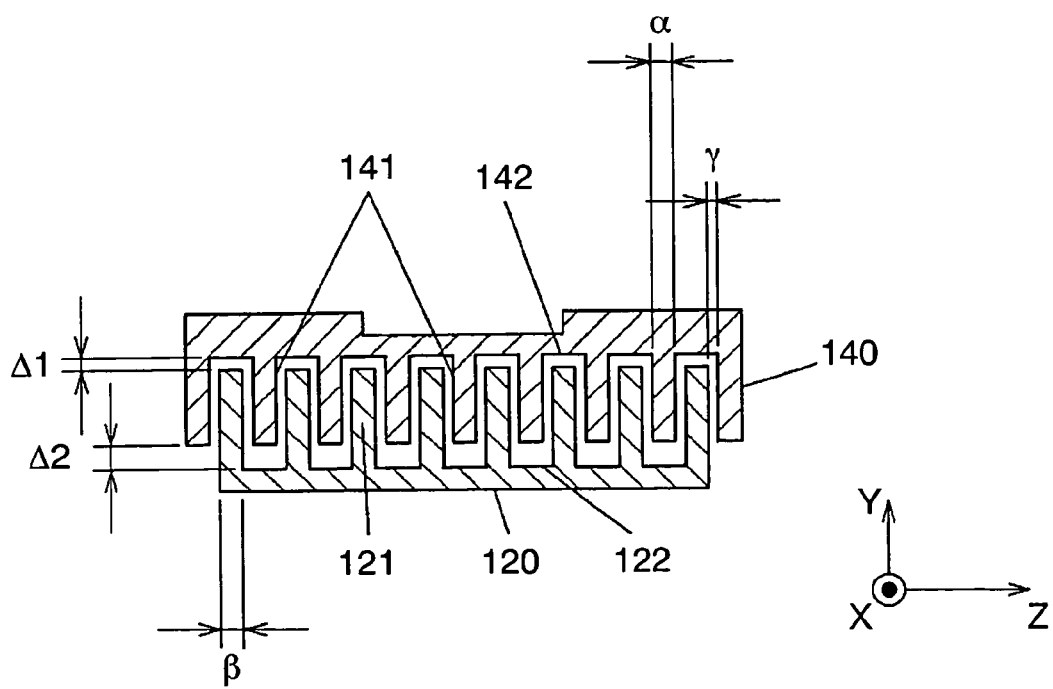
FIG. 4 is a view showing a positional relationship between a heat radiation part and a heat sink part in the photographing apparatus according to the embodiment of the present invention.

FIG. 4 is a view showing a positional relationship between heat radiation part 120 and heat sink part 140 in photographing apparatus 1 according to the embodiment of the present invention. As shown in FIG. 4, a front end of convex part 121 of heat radiation part 120 is spaced apart from flat part 142 of heat sink part 140 by gap Δ1 of about 0.5 mm, interval γ between convex part 121 of heat radiation part 120 and convex part 141 of heat sink part 140 is about 0.5 mm, and a front end of convex part 141 of heat sink part 140 is spaced apart from flat part 122 of heat radiation part 120 by gap Δ2 of about 1.0 mm. As described above, width α of convex part 141 of heat sink part 140 is 1.0 mm and width β of convex part 121 of heat radiation part 120 is 1.0 mm.

As shown in FIG. 3, in photographing apparatus 1 according to a first embodiment of the present invention, since base 6 of pickup device driving apparatus 70 is attached to base attaching part 3 and base attaching part 3 is threadably fixed to lens mounting part 2, heat radiation part 120 provided in pickup device driving apparatus 70 is positioned relative to lens mounting part 2. Since heat sink part 140 is attached to attaching member 150 and attaching member 150 is attached to lens mounting part 2, heat sink part 140 is also positioned relative to lens mounting part 2. Accordingly, in photographing apparatus 1 according to the embodiment of the present invention, the interval between heat radiation part 120 and heat sink part 140 can be accurately determined.

In order to confirm an effect that the temperature is suppressed from rising due to radiation of photographing apparatus 1 according to the embodiment of the present invention, three experiments were performed as follows:

(1) in a case where heat radiation part 120 was provided, heat sink part 140 was not provided, and heat in the vicinity of pickup device 15 was radiated into a case.

(2) in a case where heat radiation part 120 and heat sink part 140 were provided, and heat in the vicinity of pickup device 15 was radiated from heat radiation part 120 to heat sink part 140.

(3) in a case where heat radiation part 120 and heat sink part 140 were provided and the other end of heat sink part 140 is cooled by fan motor 130 such that heat in the vicinity of pickup device 15 is radiated, maximum values of the temperature in the vicinity of pickup device 15 were measured in a state that a heating value of 452 mW is generated in the vicinity of pickup device 15.

As a result, in the case (1), the temperature rises by about 9.8 degrees at the rear surface of pickup device 15. In the case (2), the temperature rises by about 8.6 degrees. In case (3), the temperature rises by about 5.9 degrees.

That is, it can be seen that, by providing heat sink part 140, heat sink efficiency is improved by about 10% and, by cooling the other end of heat sink part 140 using fan motor 130, heat sink efficiency is improved by about 40%, compared with a configuration without heat sink part 140.

Photographing apparatus 1 according to the embodiment of the present invention is a monitoring camera apparatus which performs photographing while switching filter part 5 according to brightness of an environment day and night. In other words, in a bright environment, the infrared cut filter is disposed on the optical axis and color image photographing is performed in a visible light area, and in a dark environment, the infrared cut filter disposed on the optical axis is removed and monochromic image photographing is performed by light beam having a wavelength including infrared light area. In photographing device 1, the brightness of the environment can be detected by comparing illumination intensity detected by illumination-intensity detecting part (not shown) mounted in a circuit part (not shown) with a predetermined threshold value. When the illumination intensity detected by the illumination-intensity detecting part is changed to exceed the predetermined threshold value, it is determined that transition from daytime to nighttime occurs. Thus, the circuit part switches filter part 5. In addition, the switching of filter part 5 can be performed by DC motor part 4 attached to base attaching part 3.

In photographing apparatus 1 according to the embodiment of the present invention, the switching of filter part 5 is performed when the illumination intensity is changed. At this time, since the infrared cut filter is disposed or detached (hereinafter, referred to as attached/detached) on the optical axis or the wavelength of the light beam used for photographing varies, the optical path length is changed and thus an optimal focusing position from lens part 101 to a surface (hereinafter, referred to as pickup surface 83) on which a photoelectric converting element is disposed in pickup device 15 is changed. In order to correct change in optical path length, in photographing device 1 according to the embodiment of the present invention, pickup device driving apparatus 70 for moving pickup device 15 in the optical axis direction (X axis direction) in a state that pickup surface 83 is held in a direction perpendicular to the optical axis direction of lens part 101 (that is, a state that pickup surface 83 is located in a plane parallel to a YZ plane in FIG. 1) is mounted.

Now, pickup device driving apparatus 70 mounted on pickup device 1 according to the embodiment of the present invention will be described.

Figure 5:
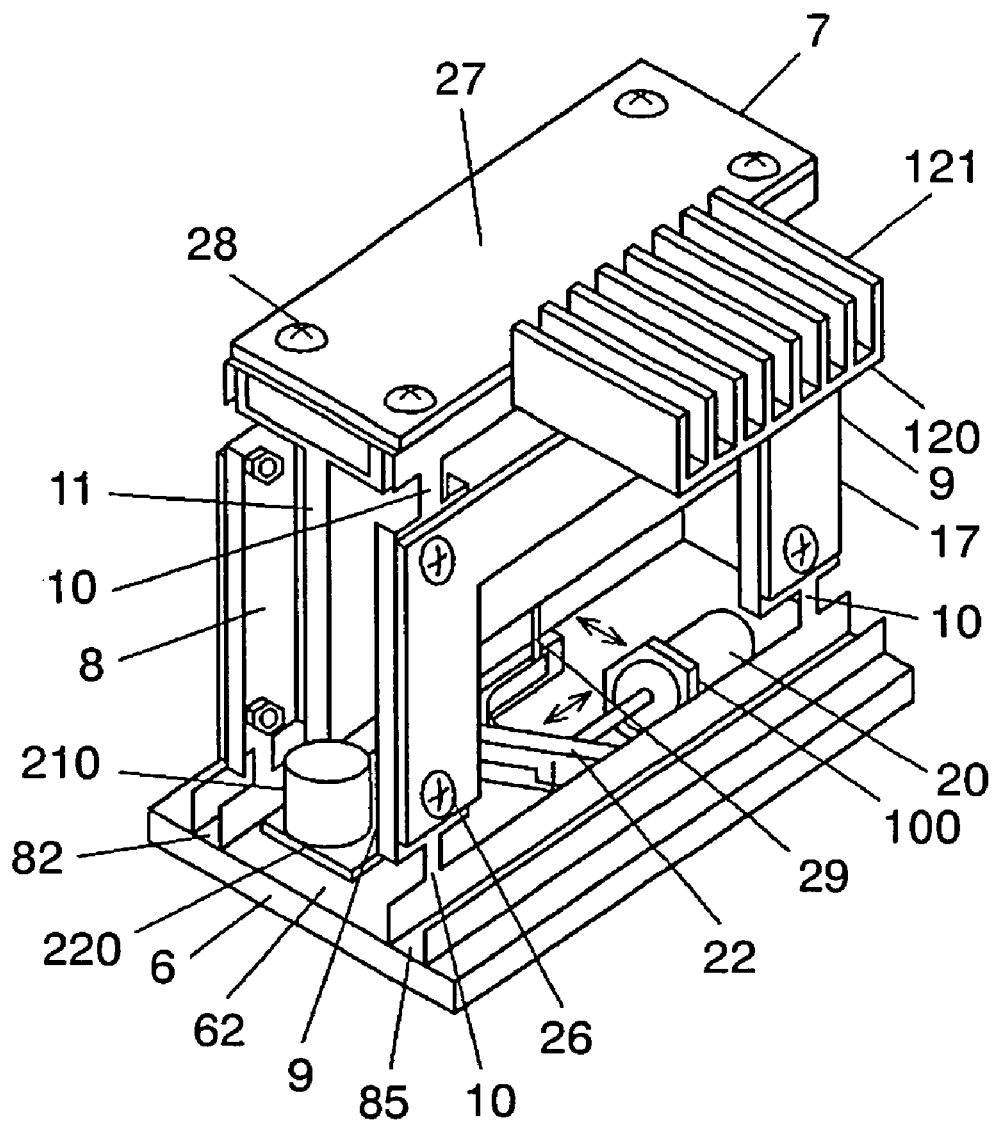
FIG. 5 is a perspective view showing a configuration of a pickup device driving apparatus according an embodiment of the present invention.
Figure 6:
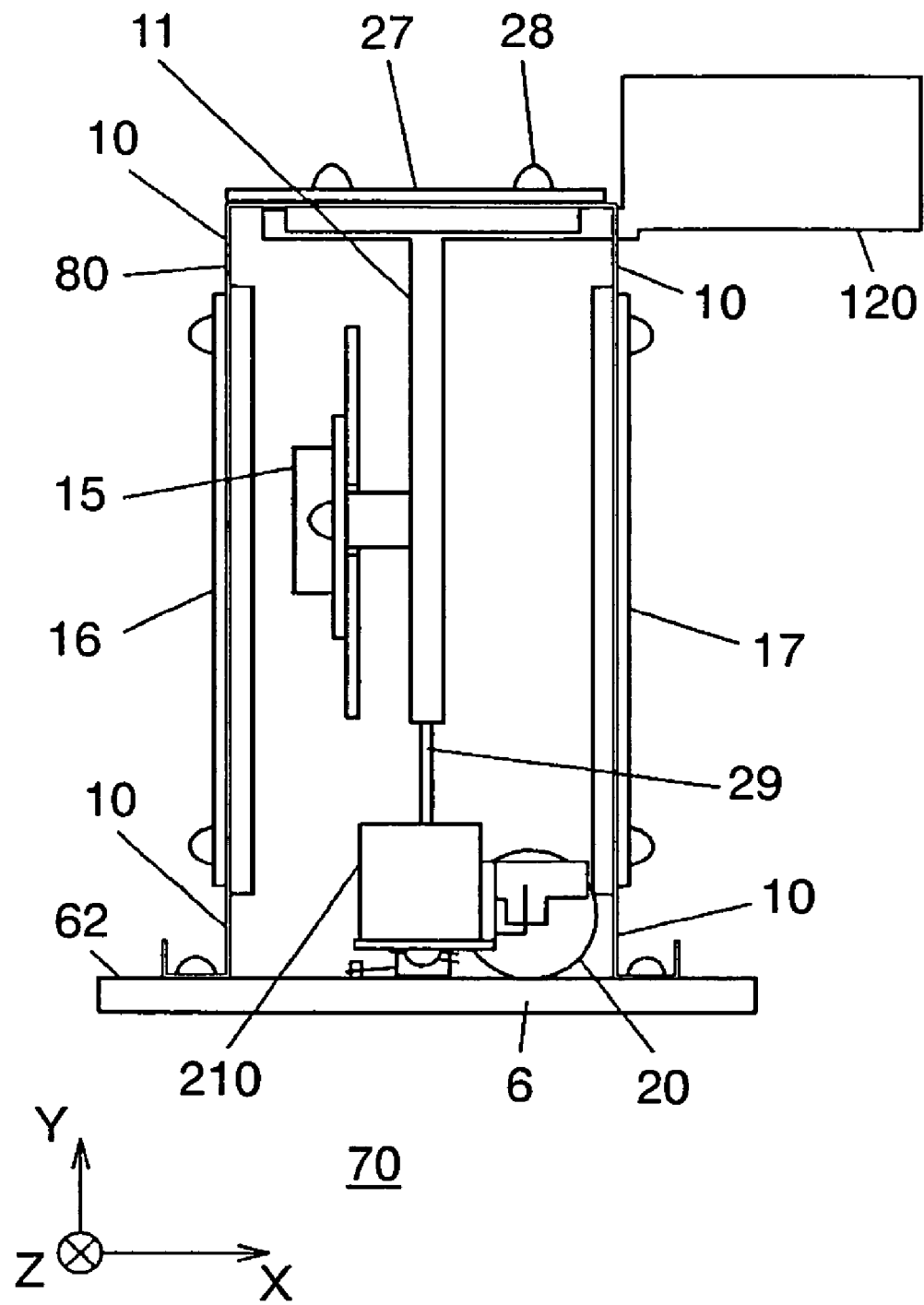
FIG. 6 is a side view showing the configuration of the pickup device driving apparatus according to the embodiment of the present invention.
Figure 7:
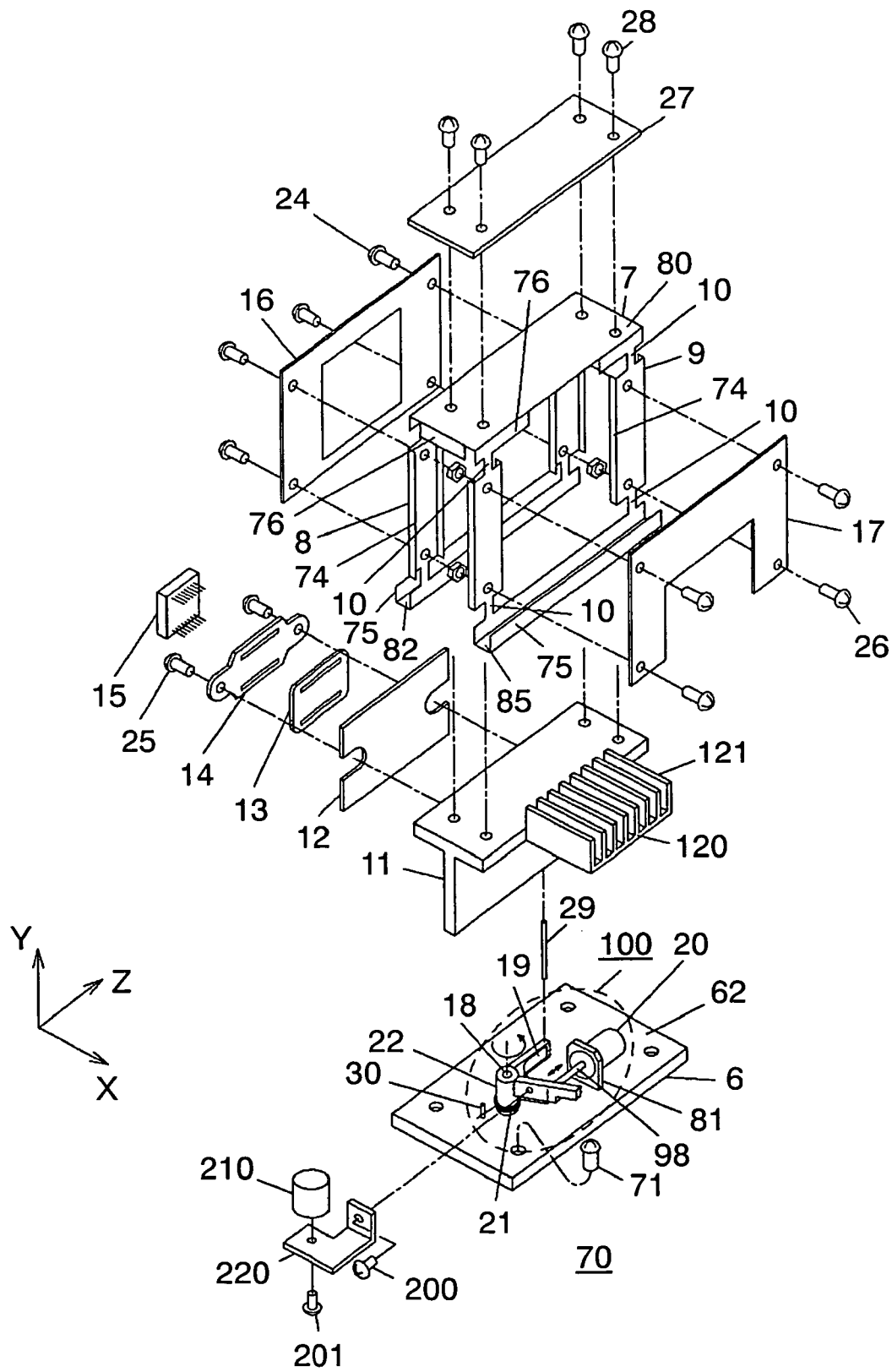
FIG. 7 is an exploded perspective view showing the pickup device driving apparatus according to the embodiment of the present invention when viewed from the opposite side of a lens part.

FIG. 5 is a perspective view showing a configuration of pickup device driving apparatus 70 according to an embodiment of the present invention, FIG. 6 is a side view of the configuration of pickup device driving apparatus 70, and FIG. 7 is an exploded perspective view showing pickup device driving apparatus 70 when viewed from the opposite side of lens part 101. In FIGS. 5, 6 and 7, the shapes of some elements are schematically shown in comparison with the configuration shown in FIG. 1.

As shown in FIG. 5, 6, or 7, pickup device driving apparatus 70 according to the embodiment of the present invention includes base 6 which is attached to base attaching part 3 fixed to lens part 101 by screw 71, first support part 8 and second support part 9 which are mounted on base surface 62 of base 6 in parallel to each other and have the same height in the Y axis direction, rectangular movable part 7 which is attached parallel to base surface 62 in a state that first support part 8 and second support part 9 are placed parallel to each other, leaf springs 10 which are provided between movable part 7 and first support part 8, between movable part 7 and second support part 9, between base 6 and first support part 8, and between base 6 and second support part 9, reinforcement plate 27 which is attached to the upper surface of movable part 7 by screw 28, first reinforcement plate 16 which is attached to first support part 8 by screw 24 and reinforces mechanical rigidity of first support part 8, second reinforcement plate 17 which is attached to second support part 9 by screw 26 and reinforces mechanical rigidity of second support part 9, pickup device holding part 11 which is attached to the surface (rear surface) opposite to the surface (front surface), on which reinforcement plate 27 of movable part 7 is mounted, by screw 28, is attached with pickup device circuit part 12 having pickup device 15 through insulating sheet 13 and heat sink plate 14 by screw 25, and has above-described heat radiation part 120, pin 29 which is provided on the lower surface facing base surface 62 of pickup device holding part 11, actuator holding part 81 which is mounted on base surface 62, linear actuator 20 which is held by actuator holding part 81, driving direction changing part 22 which is pivotably supported by bearing part 18 mounted on base surface 62 to be rotated in the Y axis direction, leaf spring 19 which is mounted in driving direction changing part 22 and slides pin 29 interposed between driving direction changing part 22 and leaf spring 19, coil spring 21 which is an elastic member for providing an elastic force to driving direction changing part 22 in the opposite direction of a bias force applied from linear actuator 20, spring fixing part 30 for holding coil spring 21, and balance member 220 which is threadably fixed to driving direction changing part 22 by screw 200 and attached with weight 210 by screw 201 in order to hold balance with heat radiation part 120 provided in pickup device holding part 11.

When pickup device driving apparatus 70 according to the embodiment of the present invention includes coil spring 21, driving direction changing part 22 is brought into contact with axis 98 of linear actuator 20 and thus driving direction changing part 22 is smoothly moved. Accordingly, pickup device 15 is smoothly moved in the optical axis direction.

As shown in FIG. 5, 6 or 7, in pickup device driving apparatus 70 according to the embodiment of the present invention, movable part 7, first support part 8, second support part 9, and leaf springs 10 are formed by U-shaped integral member 80 which is subjected to a bending process in a U shape. As a material of U-shaped member 80, a material having relatively low rigidity such as a SUS material having a thickness of 0.12 mm can be used.

Base attaching part 3, base 6, and pickup device holding part 11 may be manufactured by a die casting method using aluminum.

As a material of reinforcement plate 27, first reinforcement plate 16, and second reinforcement plate 17, a material having relatively high rigidity such as a SUS material having a thickness of 0.5 mm can be used in order to reinforce the mechanical rigidity of U-shaped member 80.

In pickup device driving apparatus 70 according to the embodiment of the present invention, first support part 8, second support part 9, movable part 7, and leaf springs 10 are formed by U-shaped integral member 80. First reinforcement plate 16 and second reinforcement 17 are attached to portions of first support part 8 and second support part 9, respectively. Bent parts 74 are provided at the sides of first support part 8 and second support part 9. Thus, rigidity of first support part 8 and second support part 9 is higher than that of leaf springs 10.

Bent parts 76 are also provided at portions of movable part 7 of U-shaped member 80, and reinforcement plate 27 is attached to movable part 7. Thus, rigidity of movable part 7 is higher than that of leaf springs 10.

Bent parts 75 are provided at the ends of attachment surfaces 82 and 85 of U-shaped member 80 to be attached to base surface 62. Thus, rigidity of this portion can increase.

Since portions between first support part 8 and second support part 9 and movable part 7 of U-shaped member 80 are not subjected to a reinforcement process such as a bending process and have widths narrower than those of the other portions, these portions function as leaf springs 10.

Similarly, since portions between attachment surfaces 82 and 85 of U-shaped member 80 and first support part 8 and second support part 9 are not subjected to a reinforcement process such as a bending process and have widths narrower than those of the other portions, these portions also function as leaf springs 10.

In pickup device driving apparatus 70 according to the embodiment of the present invention, attachment surface 82 in which first support part 8 is in contact with base surface 62 and attachment surface 85 in which second support part 9 is in contact with base surface 62 are attached to base surface 62 by screw 71 to be parallel to the Z axis direction perpendicular to the optical axis direction (X axis direction).

Now, a configuration of driving part 100 of pickup device driving apparatus 70 according to the embodiment of the present invention will be described in detail.

FIGS. 8A and 8B are plan views showing a configuration of driving part 100 in pickup device driving apparatus 70 according to the embodiment of the present invention. In FIG. 8, balance member 220 having weight 210, which is included in pickup device driving apparatus 70 of photographing apparatus 1 according to the embodiment of the present invention, is omitted.

As shown in FIG. 8A, in pickup device driving apparatus 70 according to the embodiment of the present invention, linear actuator 20 presses driving direction changing part 22 in a downward direction (−Z axis direction) of the drawing by axis 98 which can be moved in a vertical direction (Z axis direction) of the drawing. Coil spring 21 for applying an elastic bias force in the opposite direction of the bias force of linear actuator 20 is mounted on driving direction changing part 22. One end of coil spring 21 is fixed by spring fixing part 30. In a state shown in FIG. 8A, the bias force of linear actuator 20 and the bias force of coil spring 21 are in balance and thus driving direction changing part 22 is in a stop state. Leaf spring 19 is attached to driving direction changing part 22 by screw 99 such that pin 29 of pickup device holding part 11 is interposed between driving direction changing part 22 and leaf spring 19. Pin 29 slides between driving direction changing part 22 and leaf spring 19 by changing the press force of linear actuator 20.

FIG. 8B shows a state of driving part 100 when the press force of linear actuator 20 increases, in pickup device driving apparatus 70 according to the embodiment of the present invention.

As shown in FIG. 8B, when the press force of linear actuator 20 increases in a state shown in FIG. 8A, that is, when axis 98 extends in the downward direction (−Z axis direction) of the drawing, axis 98 presses driving direction changing part 22 and driving direction changing part 22 rotates on bearing part 18 in a clockwise direction. Thus, pin 29 is moved in a right direction (X axis direction) of the drawing.

Accordingly, in pickup device driving apparatus 70 according to the embodiment of the present invention, since driving direction changing part 22 for changing an output direction of linear actuator 20 is included in driving part 100, linear actuator 20 need not be the optical axis direction (X axis direction). Accordingly, linear actuator 20 may be arranged in a direction (Z axis direction) perpendicular to the optical axis direction and thus miniaturization of the apparatus can be realized.

Figure 9A:
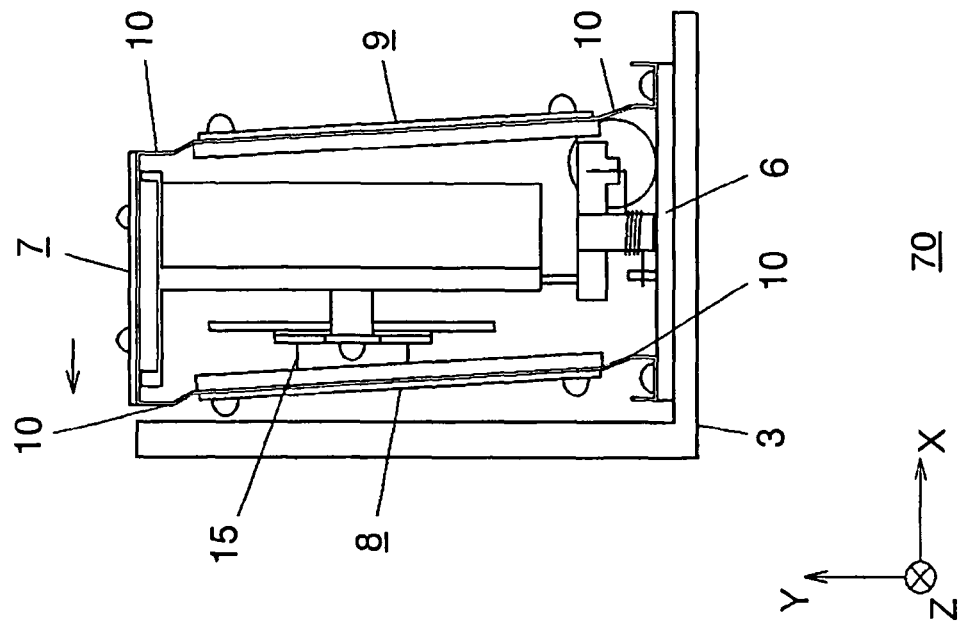
FIG. 9A is a view explaining an operation of the pickup device driving apparatus according to the embodiment of the present invention.
Figure 9B:
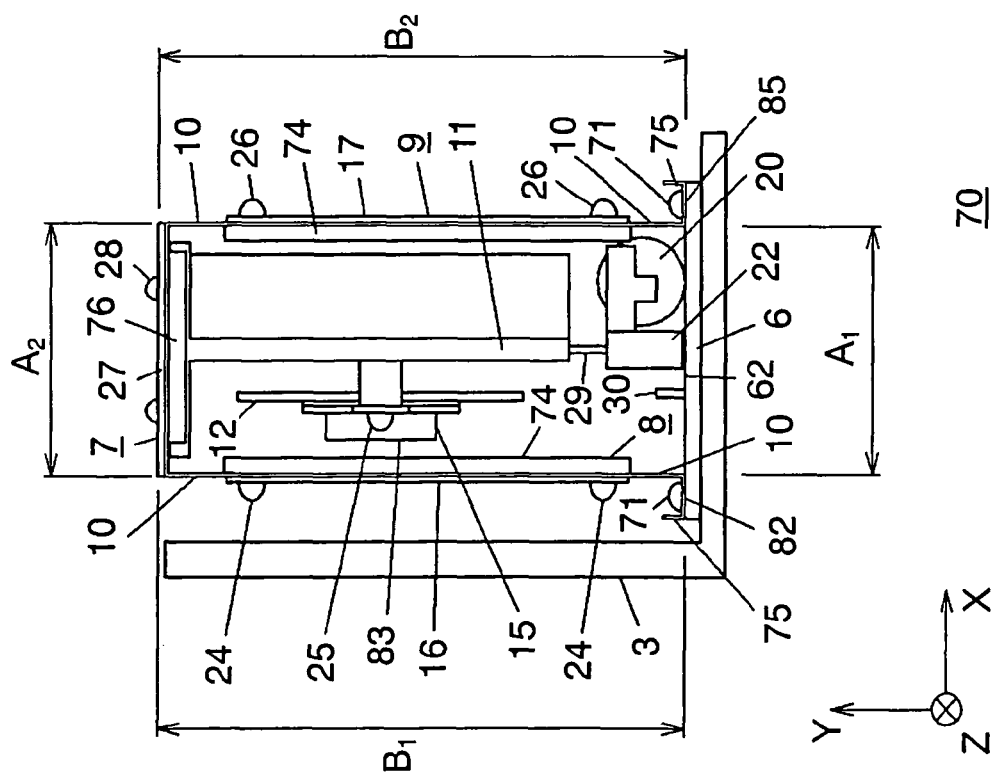
FIG. 9B is a view explaining the operation of the pickup device driving apparatus according to the embodiment of the present invention.

Now, an operation of pickup device driving apparatus 70 according to the embodiment of the present invention will be described in detail with reference to FIGS. 9A to 9B. FIGS. 9A and 9B are views explaining the operation of pickup device driving apparatus 70 according to the embodiment of the present invention. Even in FIGS. 9A and 9B, balance member 220 having weight 210, which is included in pickup device driving apparatus 70 of pickup device 1 according to the embodiment of the present invention, is omitted.

FIG. 9A is a side view showing an example of the operation of pickup device driving apparatus 70 according to the embodiment of the present invention, and FIG. 9B is a side view showing an example when the position of pickup device 15 is changed.

In FIG. 9A, first support part 8 and second support part 9 of pickup device driving apparatus 70 are perpendicular to base surface 62. Distance $A_1$ between first support part 8 and second support part 9 on base surface 62 is equal to distance $A_2$ between first support part 8 and second support part 9 at a connection portion with movable part 7 in the optical axis direction (X axis direction). Since height $B_1$ of first support part 8 from base surface 62 to movable part 7 is equal to height $B_2$ of second support part 9 from base surface 62 to movable part 7, movable part 7 is held parallel to base surface 62. Since base surface 62 is placed parallel to the optical axis direction (X axis direction) of lens part 101, movable part 7 is also placed parallel to the optical axis direction of lens part 101.

In pickup device driving apparatus 70 according to the embodiment of the present invention, pickup device holding part 11 including pickup device circuit part 12 having pickup device 15 is disposed on the lower surface of movable part 7. At this time, by attaching pickup surface 83 of pickup device 15 to pickup device holding part 11 to be perpendicular to the surface of movable part 7 of pickup device holding part 11, the pickup surface 83 of pickup device 15 is held perpendicular to the optical axis direction.

In a state shown in FIG. 9A, the force of axis 98 of linear actuator 20 for pressing driving direction changing part 22 and the force of coil spring 21 for pressing driving direction changing part 22 in the opposite direction thereof by the elastic force are in balance and pin 29 provided on driving direction changing part 22 is in a stop state, as described in FIG. 8A. From this state, linear actuator 20 is operated to reduce the bias force applied to driving direction changing part 22. Then, the force of coil spring 21 for pressing driving direction changing part 22 becomes larger than the force of linear actuator 20 for pressing driving direction changing part 22, driving direction changing part 22 rotates on bearing part 18, and pin 29 provided on the front end thereof is moved to the left side of FIG. 9A. By this movement, pickup device holding part 11 is moved in a left direction (−X axis direction) of the drawing, as shown in FIG. 9B. Since pickup device holding part 11 is moved in the left direction of the drawing, leaf springs 10 provided between movable part 7 and first support part 8, between movable part 7 and second support part 9, between base surface 62 and first support part 8, and between base surface 62 and second support part 9 are elastically deformed. Accordingly, in pickup device driving apparatus 70 according to the embodiment of the present invention, first support part 8 and second support part 9 rotate on leaf springs 10 (as rotating part), that is, rotate in directions perpendicular to the optical axis direction and parallel to each other, respectively (Z axis direction in FIGS. 9A and 9B). Thus, first support part 8 and second support part 9 rotate relative to base 6 and movable part 7.

In other words, when pickup device 15 is moved from a state of FIG. 9A to a state of FIG. 9B, since height $B_1$ of first support part 8 and height $B_2$ of second support part 9 are equal to each other and distance $A_2$ between first support part 8 and second support part 9 at the connection portion with movable part 7 and distance $A_1$ between first support part 8 and second support part 9 on base surface 62 are equal to each other as described above, movable part 7, first support part 8, second support part 9 and base surface 62 are deformed to form a substantial parallelogram. Accordingly, in pickup device driving apparatus 70 according to the embodiment of the present invention, the position of pickup device 15 can be moved in the optical axis direction while movable part 7 is held parallel to base surface 62. At this time, pickup device 15 is moved in a state that pickup surface 83 of pickup device 15 placed perpendicular to movable part 7 is held in a predetermined direction upon attachment (pickup surface 83 of pickup device 15 is held perpendicular or orthogonal to the optical axis direction).

In pickup device driving apparatus 70 according to the embodiment of the present invention, contrary to the above, in order to move pickup device 15 to be apart from lens part 101, by increasing the press force of linear actuator 20, the bias force applied to driving direction changing part 22 becomes stronger. Then, as shown in FIG. 8B, the bias force of coil spring 21 for biasing driving direction changing part 22 becomes larger than the bias force of linear actuator 20 for biasing driving direction changing part 22, driving direction changing part 22 rotates on bearing part 18 in a direction (clockwise direction) opposite to the above, and pin 29 provided on the front end thereof is also moved to the right side of FIG. 9A. Pickup device holding part 11 is moved in the right direction (X axis direction) by movement of pin 29.

In pickup device driving apparatus 70 according to the embodiment of the present invention, since movable part 7 is supported by first support part 8 and second support part 9 which have the same height from base surface 62, are parallel to each other and rotate in the optical axis direction, movable part 7 can be moved in the optical axis direction while being always held parallel to base surface 62. Since pickup device holding part 11 is attached such that pickup surface 83 of pickup device 15 is disposed in the direction perpendicular the movable part 7, pickup device 15 can be moved in the optical axis direction while pickup surface 83 thereof is held perpendicular to the optical axis direction. Thus, pickup device 15 can be moved with high precision.

In pickup device driving apparatus 70 according to the embodiment of the present invention, mechanisms for moving pickup device 15 in the optical axis direction, that is, mechanisms which include attachment surface 82 contacting with base surface 62, first support part 8, movable part 7, second support part 9, attachment surface 85, and leaf springs 10, can be manufactured by performing processes, such as punching and molding, on an integral plate material. Accordingly, since friction or rattle is extremely low, driving can be performed with high precision even when slight driving is performed.

Now, balance member 220 having weight 210, which is included in pickup device driving apparatus 70 of photographing apparatus 1 according to the embodiment of the present invention, will be described in detail.

Figure 10A:
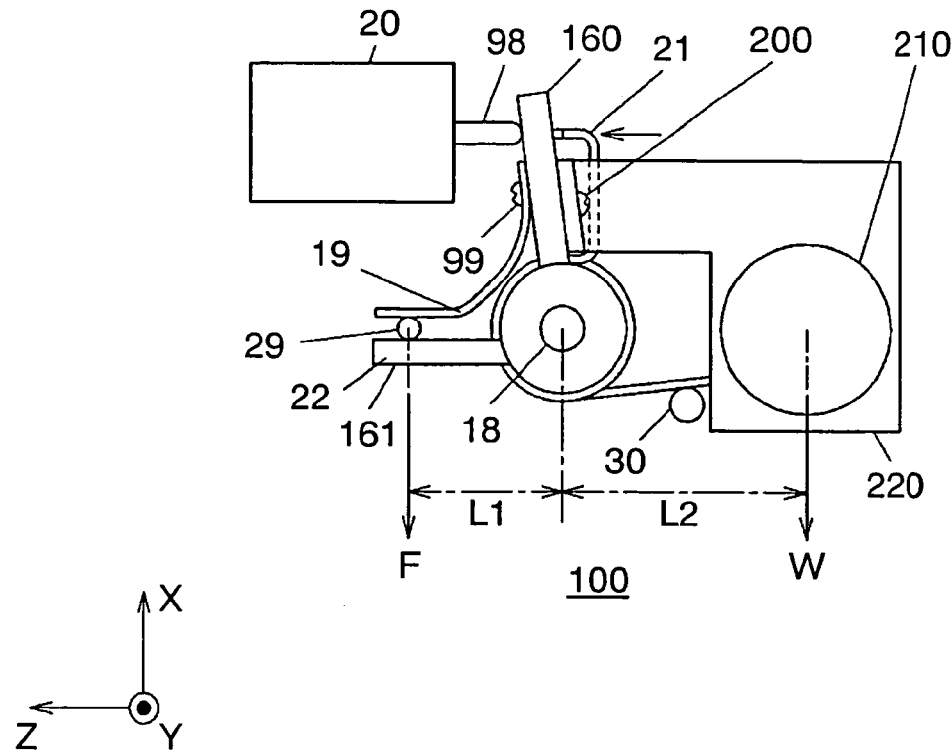
FIG. 10A is a view showing a balance member mounted on the pickup device driving apparatus of the photographing apparatus according to the embodiment of the present invention.
Figure 10B:
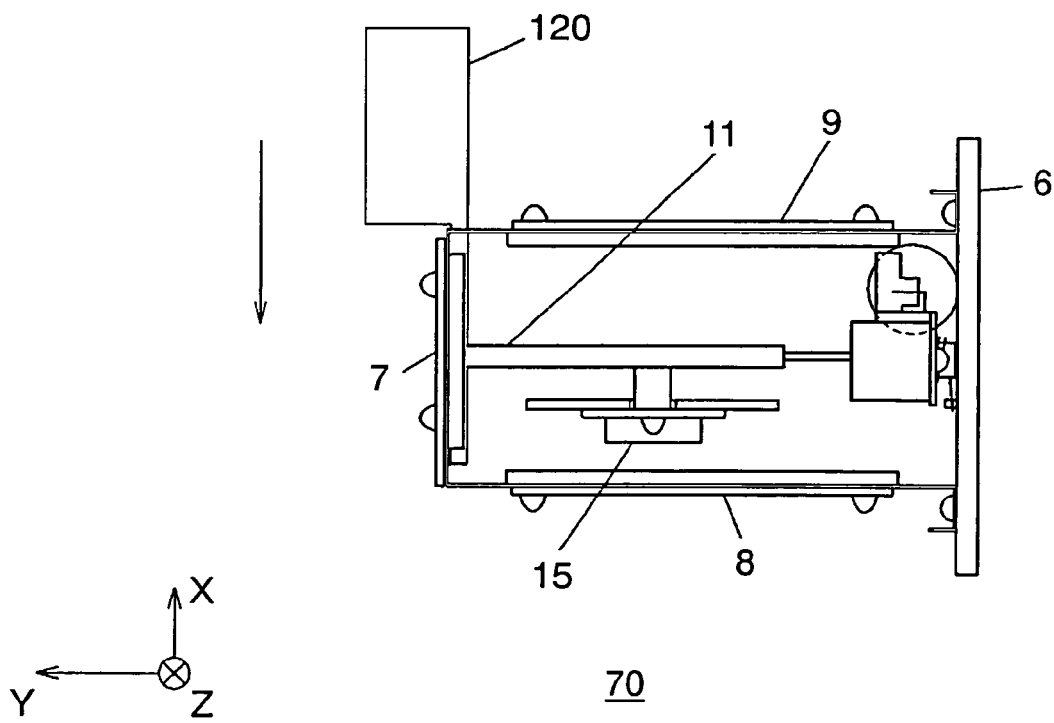
FIG. 10B is a view showing the balance member mounted on the pickup device driving apparatus of the photographing apparatus according to the embodiment of the present invention.

FIGS. 10A and 10B are views showing balance member 220 mounted on pickup device driving apparatus 70 of photographing apparatus 1 according to the embodiment of the present invention. FIG. 10A is a plan view showing a peripheral configuration of balance member 220. In pickup device driving apparatus 70 according to the embodiment of the present invention, balance member 220 is provided in order to reduce a load applied to linear actuator 20 when lens part 101 of pickup device 1 is disposed at the lower side as shown in FIG. 10B.

As shown in FIG. 10A, driving direction changing part 22 includes first contact part 160 which is in contact with axis 98 of linear actuator 20 and second contact part 161 which is in contact with pickup device holding part 11 connected to movable part 7, and weight 210 is provided at the side opposite to the side of driving direction changing part 22 having second contact part 161 with respect to the bearing part 18.

Accordingly, in the state shown in FIG. 10B, in the vicinity of driving part 100, downward moment F is generated in the left side of driving direction changing part 22 with respect to bearing part 18, due to the weight of heat radiation part 120 and pickup device holding part 11, as shown in FIG. 10A. Since this moment F rotates driving direction changing part 22 in a counterclockwise direction in FIG. 10A, in this state, driving direction changing part 22 cannot rotate in a clockwise direction in the same torque as torque applied to linear actuator 20 when photographing apparatus 1 is placed on the horizontal plane of earth. To this end, in photographing apparatus 1 according to the embodiment of the present invention, balance member 220 having weight 210 is provided at the side opposite to the side of driving direction changing part 22 having pin 29 with respect to bearing part 18. By this configuration, as shown in FIG. 10A, since a downward force, that is, moment W for rotating driving direction changing part 22 in the clockwise direction can be generated by weight 210, linear actuator 20 rotates driving direction changing part 22 with the same torque as when photographing apparatus 1 is placed on the plane. The length of the arm of driving direction changing part 22 or the position and the weight of weight 210 is preferably determined such that moment F and moment W are in balance.

In photographing apparatus 1 according to the embodiment of the present invention, weight increment W1 (that is, increment from the weight previously balanced by the elastic force of coil spring 21) due to heat radiation part 120 is 2.5 g and weight W2 of weight 210 is 1.67 g. Distance L1 from the center of bearing part 18 to pin 29 is 11.0 mm and distance L2 from the center of bearing part 18 to the gravity center of weight 210 is 16.5 mm. It is preferable that W1×L1=W2×L2 is satisfied such that moment F and moment W are in balance. When the elastic force of coil spring 21 is very small and ignorable, the weight increment W1 may be the total weight of the members driven by linear actuator 20.

Figure 11A:
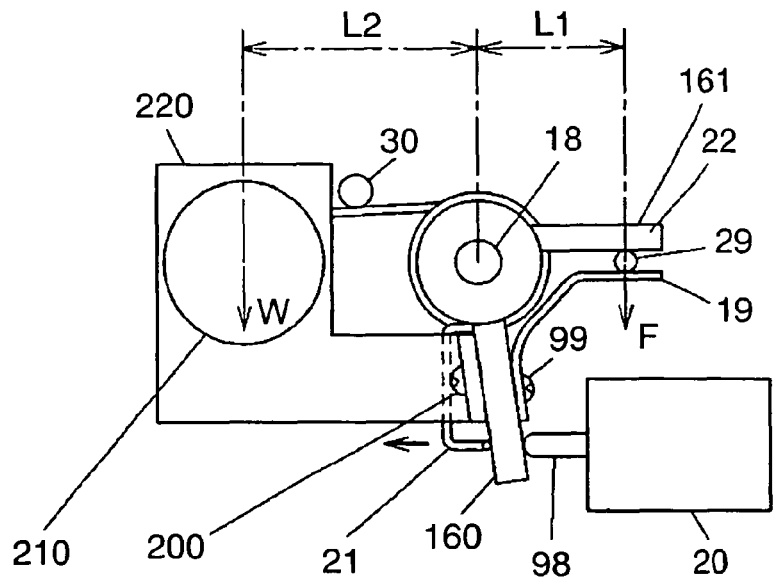
FIG. 11A is a view showing another example of the balance member mounted on the pickup device driving apparatus of the photographing apparatus according to the embodiment of the present invention.
Figure 11A:
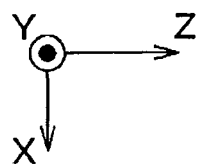
Figure 11B:
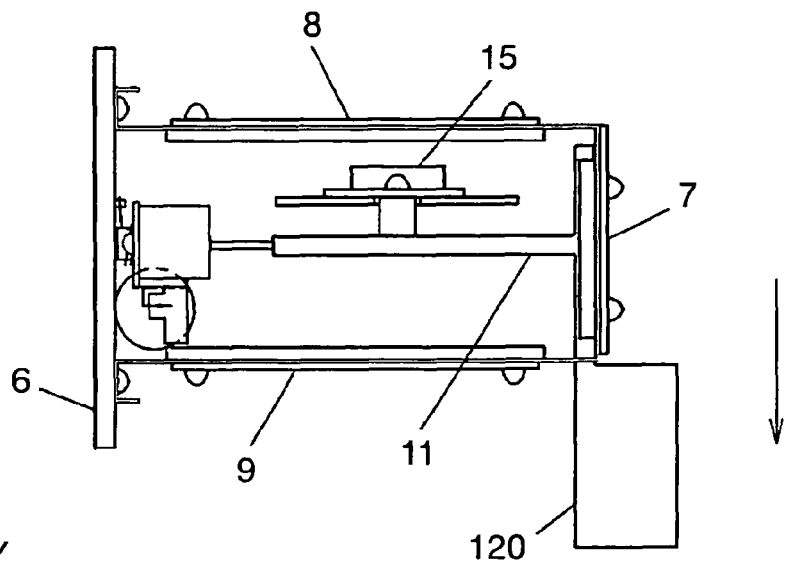
FIG. 11B is a view showing another example of the balance member mounted on the pickup device driving apparatus of the photographing apparatus according to the embodiment of the present invention.
Figure 11B:
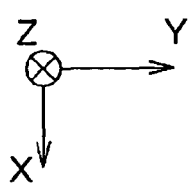

Although, in the above-described example, the description is given on photographing apparatus 1 which is disposed such that lens part 101 is disposed at the lower side, photographing apparatus 1 may be advantageously disposed such that lens part 101 is disposed at the upper side in photographing apparatus 1 according to the embodiment of the present invention. This is because, in photographing apparatus 1, moment F and moment W are in balance even when the directions thereof are in the opposite directions. FIGS. 11A and 11B are views showing another example of balance member 220 mounted on pickup device driving apparatus 70 of photographing apparatus 1 according to the embodiment of the present invention. FIG. 11A is a plan view showing a peripheral configuration of balance member 220. FIG. 11B shows the state of pickup device driving apparatus 70.

In photographing apparatus 1 according to the embodiment of the present invention, since weight 210 for adjusting the balance is provided, it is possible to realize photographing apparatus 1 having the configuration that an overload is hard to be applied to linear actuator 20 although the lens part 101 is disposed at the upper or lower side.

Although, in pickup device driving apparatus 70 according to the embodiment of the present invention, leaf springs 10 are formed between movable part 7 and first support part 8, between movable part 7 and second support part 9, between base surface 62 and first support part 8, and between base surface 62 and second support part 9 as rotating part, pickup device driving apparatus according to the present invention is not limited to this configuration.

For example, movable part 7, first support part 8, second support part 9, and base part 6 may be separately provided and a hinge part may be formed between movable part 7 and first support part 8, between movable part 7 and second support part 9, between base surface 62 and first support part 8, and between base surface 62 and second support part 9 as rotating part. According to this configuration, it is possible to realize a configuration with excellent impact resistance, in addition to the above-described effect. In such a configuration, an elastic means such as a coil spring for elastically connecting first support part 8 to second support part 9 is preferably provided in order to suppress rattle in the hinge part.

Although, in photographing apparatus 1 according to the embodiment of the present invention, the central position of pickup surface 83 of pickup device 15 is changed in a direction (Y axis direction) perpendicular to the optical axis direction due to the movement of pickup device 15 in the optical axis direction (X axis direction). However, the displacement of pickup device 15 in the direction (Y axis direction) perpendicular to the optical axis direction can be removed in practice by providing a circuit for detecting the displacement thereof using a photo-interrupter or the like, calculating the displacement of pickup device 15 in the direction (Y axis direction) perpendicular to the optical axis direction, and shifting a read area of a signal by the displacement to perform correction in the circuit part. When the displacement of pickup device 15 in the optical axis direction (X axis direction) is small, a problem is not caused in practice although the above-described correction process is not performed.

Although, in the embodiment of the present invention, the configuration for moving pickup device 15 mounted on pickup device driving apparatus 70 to be mounted on photographing device 1 in the optical axis direction in parallel by using the rectangular U-shaped member 80 and deforming it into a parallelogram is described, the pickup device driving apparatus and the photographing apparatus according to the present invention are not limited to this embodiment. Mechanisms for using driving part having axis, such as linear actuator 20, changing the driving direction thereof using driving direction changing part 22 having bearing part 18 and transferring driving force to movable part 7 are all included in pickup device driving apparatus and photographing apparatus using the same according to the present invention.

The pickup device driving apparatus according to the present invention is applicable to a structure in which a mechanism for moving pickup device holding part 11 in the optical axis direction of lens part 101 automatically moves pickup device holding part 11 using a driving means such as a motor or a structure for manually moving pickup device holding part 11 using a knob.

Although, in the embodiment of the present invention, fan motor 130 is employed as a cooling part for cooling the other end of heat sink part 140, the pickup device driving apparatus and the photographing apparatus according to the present invention is not limited to this configuration. For example, a known cooling device such as a Peltier device or a liquid cooling mechanism may be used as the cooling part.

Figure 12:
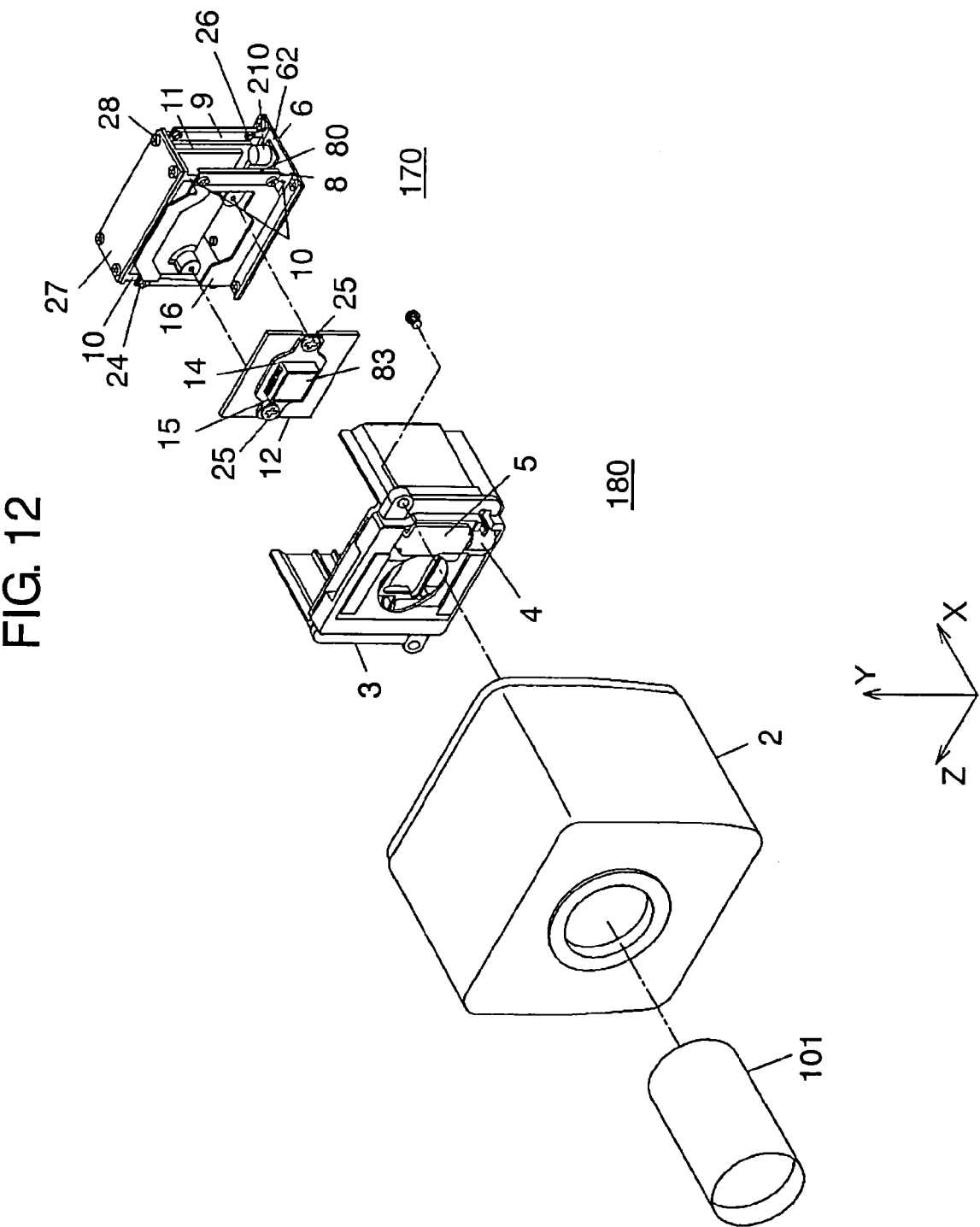
FIG. 12 is a view showing another example of the pickup device driving apparatus and the photographing apparatus according to the embodiment of the present invention.

Although, in pickup device driving apparatus 70 according to the embodiment of the present invention, heat radiation part 120 which faces heat sink part 140 provided at the upper side in the case is provided in order to radiate heat generated in the vicinity of pickup device 15, the pickup device driving apparatus and the photographing apparatus using the same according to the present invention are not limited to this configuration. FIG. 12 shows another example of the pickup device driving apparatus and the photographing apparatus according to the embodiment of the present invention. For example, as shown in FIG. 12, pickup device driving apparatus 170 without heat radiation part 120 and photographing apparatus 180 using the same are included in pickup device driving apparatus and photographing apparatus using the same according to the present invention.

Although, examples of mounting the pickup device driving apparatus according to the embodiments of the present invention on a monitoring camera apparatus are described, the use of the photographing apparatus according to the present invention is not limited to the monitoring camera apparatus. For example, the pickup device driving apparatus may be mounted on every known photographing apparatus such as a video camera or a digital camera.

INDUSTRIAL APPLICABILITY

As described above, according to a pickup device driving apparatus and a photographing apparatus using the same according to the present invention, even when a pickup device is moved in an optical axis direction, it is possible to allow heat generated in the vicinity of the pickup device to escape without generating a frictional force. The present invention is applicable to a photographing apparatus such as a monitoring camera apparatus or a video camera apparatus, and more particularly, to a pickup device driving apparatus for moving a pickup device in an optical axis direction of a lens part and a photographing apparatus using the same.

The invention claimed is:

1. A pickup device driving apparatus comprising:
 a movable part which has a pickup device and is capable of moving the pickup device in a first direction while a direction of a pickup surface is held;
 a driving part which has an axis part and is capable of moving the axis part in a second direction different from the first direction such that the movable part is moved;
 a direction changing part which is in contact with the axis part of the driving part and the movable part, has a rotation axis part provided in a third direction perpendicular to the first direction and the second direction, rotates on the rotation axis part, changes a bias force applied in the second direction by the axis part of the driving part to a bias force applied in the first direction, and applies the bias force to the movable part to move the movable part; and
 a weight part which is provided in the direction changing part to generate a rotation moment which cancels a rotation moment of the rotation axis part generated in the direction changing part by the inclination of the movable part.

2. The pickup device driving apparatus of claim 1, wherein the direction changing part includes a first contact part which is in contact with the axis part of the driving part and a second contact part which is in contact with the movable part, and the weight part is provided at the side opposite to the side of the direction changing part having the second contact part with respect to the rotation axis part.

3. The pickup device driving apparatus of claim 2, further comprising a holding member provided at the side opposite to the side of the direction changing part having the second contact part with respect to the rotation axis part, for attaching the weight part.

4. The pickup device driving apparatus of claim 1, further comprising an elastic member for applying an elastic force to the direction changing part in an opposite direction of the bias force applied by the axis part of the driving part.

5. The pickup device driving apparatus of claim 2, wherein, when the weight of the movable part is W1, the weight of the weight part is W2, a distance between the center of the rotation axis part and a position in which the second contact part and the movable part are in contact with each other, and a distance between the center of the rotation axis part and the gravity center of the weight part, a relationship of W1×L1=W2×L2 is satisfied.

6. The pickup device driving apparatus according to claim 1, further comprising:
 a base part fixed to a lens part;
 a first support part and a second support part which are provided between the base part and the movable part facing the base part to support the movable part;
 a first rotating part which is provided between the base part and the first support part;
 a second rotating part which is provided parallel to the first rotating part in the optical axis direction, between the base part and the second support part;
 a third rotating part which is provided between the movable part and the first support part; and
 a fourth rotating part which is provided at an apex of a parallelogram with respect to the first rotating part, the second rotating part and the third rotating part, between the movable part and the second support part,
 wherein the rotating central axes of the first rotating part, the second rotating part, the third rotating part and the fourth rotating part are perpendicular to the first direction and parallel to one another, and
 the position of the pickup device is changed relative to the lens part in a state that the first rotating part, the second rotating part, the third rotating part and the fourth rotating part form the apexes of the parallelogram by driving of the driving part.

7. The pickup device driving apparatus according to claim 6, wherein at least one of the first rotating part, the second rotating part, the third rotating part and the fourth rotating part is a leaf spring.

8. The pickup device driving apparatus according to claim 7, wherein the first rotating part, the second rotating part, the third rotating part and the fourth rotating part are leaf springs.

9. The pickup device driving apparatus according to claim 8, wherein the movable part, the first support part, the second support part and the leaf spring are integrally formed and at least one of the movable part, the first support part and the second support part has a reinforcement part for increasing rigidity.

10. The pickup device driving apparatus according to claim 1, wherein a heat radiation part for radiating heat generated in the vicinity of the pickup device is provided in the movable part.

11. The pickup device driving apparatus according to claim 10, wherein the heat radiation part is provided to face a heat sink part provided in a case.

12. The pickup device driving apparatus of claim 11, wherein convex parts are provided on a surface of the heat radiation part facing the heat sink part.

13. The pickup device driving apparatus of claim 12, wherein the convex parts of the heat radiation part are provided to face concave parts of irregularities provided in the heat sink part.

14. The pickup device driving apparatus of claim 12, wherein the convex parts of the heat radiation part have a fin which extends in a movement direction of the pickup device.

15. The pickup device driving apparatus of claim 11, wherein the heat radiation part is not in contact with the heat sink part within a movement range of the pickup device.

16. A photographing apparatus comprising:
a lens part;
a case;
the pickup device driving apparatus of claim 1; and
an image signal processing part which performs an image signal process on a signal output from the pickup device of the pickup device driving apparatus.

17. A monitoring camera apparatus comprising:
the photographing apparatus of claim 16;
an illumination-intensity change detecting part which detects change in illumination intensity;
a filter part which attaches and detaches an infrared cut filter on an optical axis of the lens part depending on the change in illumination intensity detected by the illumination-intensity change detecting part; and
a filter driving part which drives the movable part of the pickup device driving apparatus when the infrared cut filter of the filter part is attached and detached.

* * * * *